Dec. 7, 1965    P. J. CREIGHTON ETAL    3,222,409
RECOVERING ETHER DILUENT IN LIQUID POLYDIOLEFIN MANUFACTURE
Filed Jan. 15, 1963    5 Sheets-Sheet 4

FIGURE 4

Peter. J. Creighton
Murray Nadler          Inventors
Harold N. Wells

By C. D. Flores
                Attorney

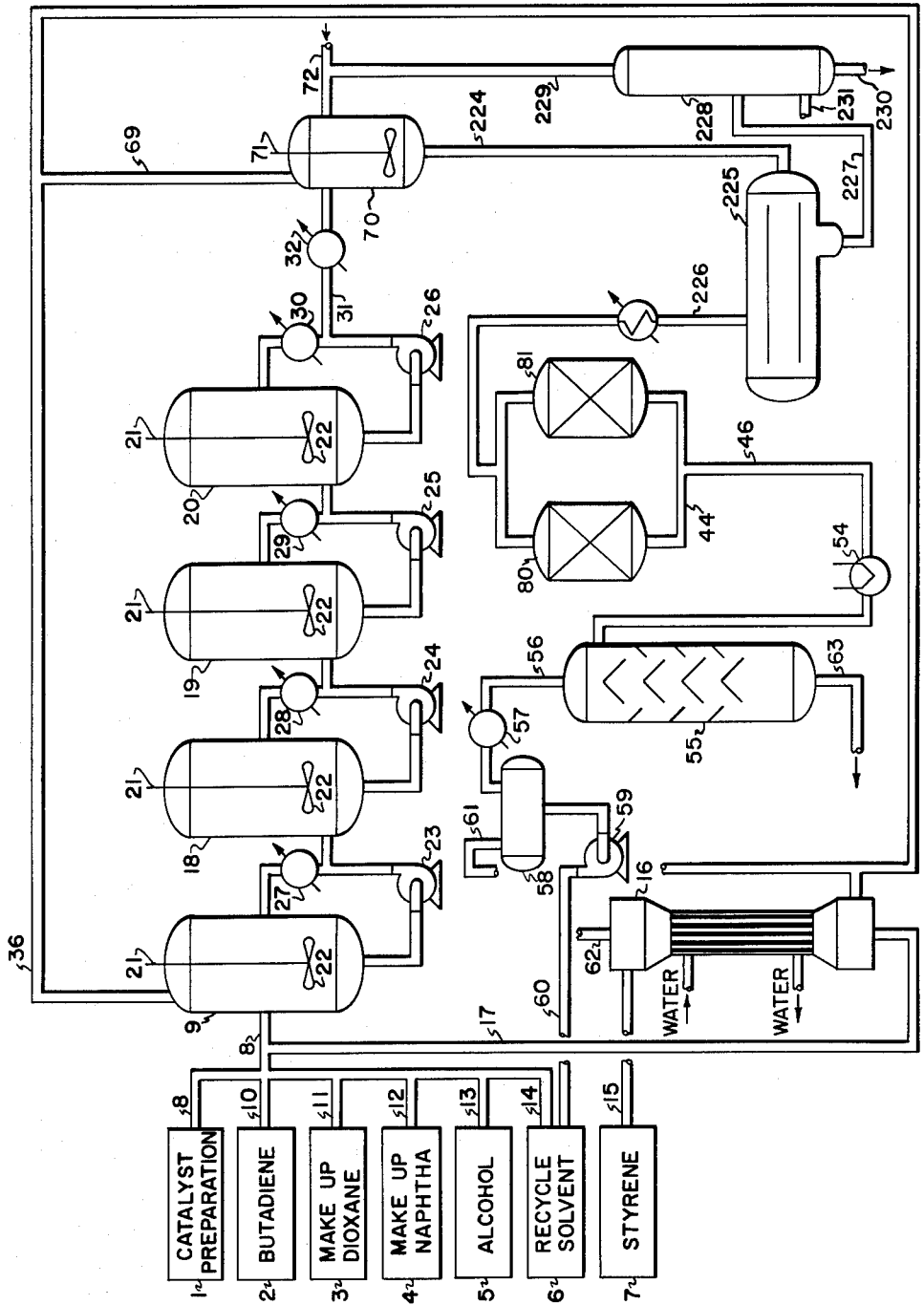

3,222,409
RECOVERING ETHER DILUENT IN LIQUID POLYDIOLEFIN MANUFACTURE

Peter J. Creighton and Murray Nadler, Morristown, and Harold N. Wells, Florham Park, N.J., assignors to Esso Research and Engineering Company, a corporation of Delaware
Filed Jan. 15, 1963, Ser. No. 251,608
5 Claims. (Cl. 260—669)

This invention relates to the preparation of liquid copolymers of diolefins and vinyl aromatic hydrocarbons. More particularly it relates to the recovery of the ether diluent used in the preparation of the liquid copolymers.

It is known to prepare liquid copolymers of conjugated diolefins, such as butadiene-1,3, with vinyl aromatic hydrocarbons such as styrene. The polymerization is generally carried out in the presence of a hydrocarbon diluent in the presence of a finely divided alkali metal catalyst at a temperature between 40 and 105° C. It has also been found desirable to employ 10-40 parts by weight of an ether modifier per 100 parts of monomers in addition to the hydrocarbon diluent. The use of the ethers is highly desirable since they improve the reproducibility of the process, control the molecular weight and structure of the polymer, shorten the induction period in batch synthesis and are particularly effective in producing a substantially colorless product.

The hydrocarbon diluent, the ether and any unreacted monomers are removed from the reaction product, after killing and removing the catalyst, by stripping the polymer solution and recycling the solvent, ether and unreacted monomers to the reaction vessel. In actual practice, the stripper offgas is cooled in a cooler-condenser to condense the ether-hydrocarbon diluent out of the stripper offgas. The condenser operates at a pressure in the range of 20 to 28 in. of Hg vacuum which is slightly lower than the stripper pressure. The chilled gas leaving the condenser containing unreacted monomer and inert gas which has previously entered the process streams, also contains considerable quantities of uncondensed ether and hydrocarbon solvent vapor.

Dioxane—the ether modifier usually employed—boils at 101° C. while the hydrocarbon solvent may boil in the range of 100° C.-200° C. In practice, the stripper offgas is normally cooled to only about 35° C. which is the temperature of cooling water, and leaves the cooler condenser under vacuum. At this temperature, and low total pressure, the vapor pressure of condensed dioxane and hydrocarbon solvent are sufficiently high to cause significant and valuable amounts of dioxane and hydrocarbon solvent to be lost from the process, in the condenser offgas, if not recovered.

Another source of loss of ether and hydrocarbon solvent from the process is in the gas stream vented from the reactor used to synthesize the polydiolefin. This gas stream purges hydrogen generated in the reactor. Since the temperature in the reactor is between 40° C. and 105° C., here again the vapor pressure of dioxane and hydrocarbon in the vent gas is enough to cause significant and valuable losses of these materials.

Still a third source of loss of dioxane and hydrocarbon is the gas stream which in actual practice is vented to remove hydrogen generated in the vessel in which the polymer is contacted with clay to remove sodium catalyst. The contacting vessel is maintained at 60° C. so that again the vapor pressure of ether and hydrocarbon solvent in the vent gas, containing also hydrogen and monomer, is sufficiently high to result in significant and valuable losses of dioxane and hydrocarbon solvent.

In accordance with this invention all purge gas streams leaving the process and containing ether and/or hydrocarbon vapor are combined and scrubbed with all or part of the high boiling vinyl aromatic monomer to recover most of the ether and hydrocarbon. Pressure in the scrubber is 1 to 5 atmospheres. Temperature is maintained at about 0 to 35° C. by providing indirect cooling in the scrubber to remove heat of absorption.

In the particular process just described, the rich gas stream going to the scrubber is made up of the cooler-condenser offgas, the reactor vent gas and the clay contacting drum vent gas. However, the invention is intended to cover scrubbing other additional vent gas streams containing ether and hydrocarbon which may occur as a result of changing the process or equipment. For example, vent gas streams may obtained from vessels in which the sodium catalyst is neutralized or washed with water. These vent streams containing ether and hydrocarbon solvent, as well as hydrogen and monomers and in some cases water, are fed to the scrubber to recover ether and hydrocarbon.

The fat liquid from the scrubber is then passed to the reaction zone enabling the dioxane and hydrocarbon solvent, otherwise lost, to be almost fully recovered.

The invention is particularly applicable to the preparation of liquid polymers by the copolymerization of conjugated olefins with vinyl aromatic hydrocarbons. In accordance with this process 60 to 85 parts by weight of a conjugated diolefin of 4 to 6 carbon atoms, such as butadiene-1,3, are copolymerized batchwise or continuously with 15 to 40 parts by weight of a vinyl aromatic hydrocarbon, such as styrene, or its homologs, such as methyl or ethyl styrene, in the presence of 0.5 to 10 parts by weight (based on monomers) of an alkali metal catalyst, such as sodium, potassium, lithium, caesium or rubidium. The polymerization is carried out in a reaction diluent at a temperature ranging from 25° to 105° C., preferably between 25° and 85° C. Materials used as diluents in the polymerization are inert hydrocarbons which remain liquid under the reaction conditions employed. Diluents boiling between −15° and 200° C. are therefore suitable, since a slight pressure can be imposed upon the reaction zone when the low boiling diluents are employed. The diluents are used in amounts ranging from 50 to 500, preferably 100 to 200 parts, per 100 parts of monomers. It is also desirable to employ about 10-40 parts of an ether modifier per 100 parts of monomers. This ether may be used in addition to or instead of the hydrocarbon diluent. The use of the ethers is highly desirable since they improve the reproducibility of the process, control the molecular weight and structure of the polymer, shorten the induction period, and are particularly effective in producing a substantially colorless product. Particularly suitable ethers are the cyclic ethers, such as dioxane-1,4 and the aliphatic ethers, such as diethyl ether. It is also desirable, but not absolutely necessary, to include 1 to 35 parts by weight, based on the catalyst, of an aliphatic alcohol in the recipe to activate the catalyst. Suitable alcohols include methanol, ethanol, isopropanol, normal butanol, normal pentanol, and the like.

Liquid products obtained by the above process in actual practice are mixed with an acid clay, such as attapulgus clay or the like, and passed through a filter in order to remove the catalyst and metallo-organic compounds, polymer gel and color bodies. Generally, the effluent from the polymerization reaction is mixed with the clay by agitation, allowing sufficient time for neutralization of the catalyst. The polymer-clay mixture is filtered, e.g., through a rotary type filter. The water content of the clay should be between 1 and 25% by weight, preferably between 5 and 15%, and should be firmly bound therein. Alternatively, acid-treated clay can be used, in which case the moisture content must not be over 1.5 to 2% in order to avoid imparting a yellow color to the final product. In accordance with the invention the vessel in which the effluent is mixed with the clay is vented and this vent gas stream along with cooler-condenser offgas and reactor vent gas are combined and contacted in a separate vessel with all or a portion of the feed styrene to absorb the dioxane or other ether. This resulting fat stream is then passed to the reaction vessel.

As previously mentioned other techniques are available for purifying liquid products from the reactor. Among these are processes in which the reactor product is neutralized with 1.1 to 2 moles of water per mole of alkali metal to react with the sodium. The reaction product is then diluted to 15 wt. percent polymer with diluent mixture and heat soaked at temperatures of 40–70° C. for from 5 minutes to 2 hours to agglomerate the sludge. The sludge is separated from the product by settling or centrifuging. Then the centrifuged or settled product is contacted with a bed of absorbent clay to remove final traces of gel and alkali metal.

In other processes the reactor product is diluted to 15 wt. percent polymer with diluent mixture and washed with one or less volumes of acidified water at 180° F.–310° F. to remove sodium from the reactor product. The ether can either be distilled out of the reactor product before washing in which case the reactor product is diluted with hydrocarbon solvent, or left in the polymer solution during washing in which case the reactor product is diluted with ether-hydrocarbon diluent and washed with acidified water containing dissolved ether. In each case, the washed reactor product is percolated over a bed of clay to remove color bodies, gel and haze. Likewise, a vent gas stream is required to remove hydrogen generated during washing or neutralization. The vent gas from the washing or neutralization vessel containing hydrogen, dioxane and hydrocarbon solvent is scrubbed to recover dioxane and hydrocarbon solvent, along with reactor vent gas and stripper condenser offgas.

It is also within the scope of this invention to apply the technique of this invention not only to continuous processes as described above but also to processes in which the polymer is synthesized in a batch process.

In order to illustrate the process of this invention, reference is had to the accompanying drawings which are diagrammatic representations of several methods of carrying out the invention, in which:

FIGURE 4 represents another modification of FIGURE 2; and

FIGURE 5 is a still further modification of FIGURE 2.

In the description, reference is had to specific comonomers and also to a specific design and arrangement of equipment. It is to be understood, however, that reasonable variations in both materials and equipment may be made without departing from the scope of the disclosure.

Figure 1:
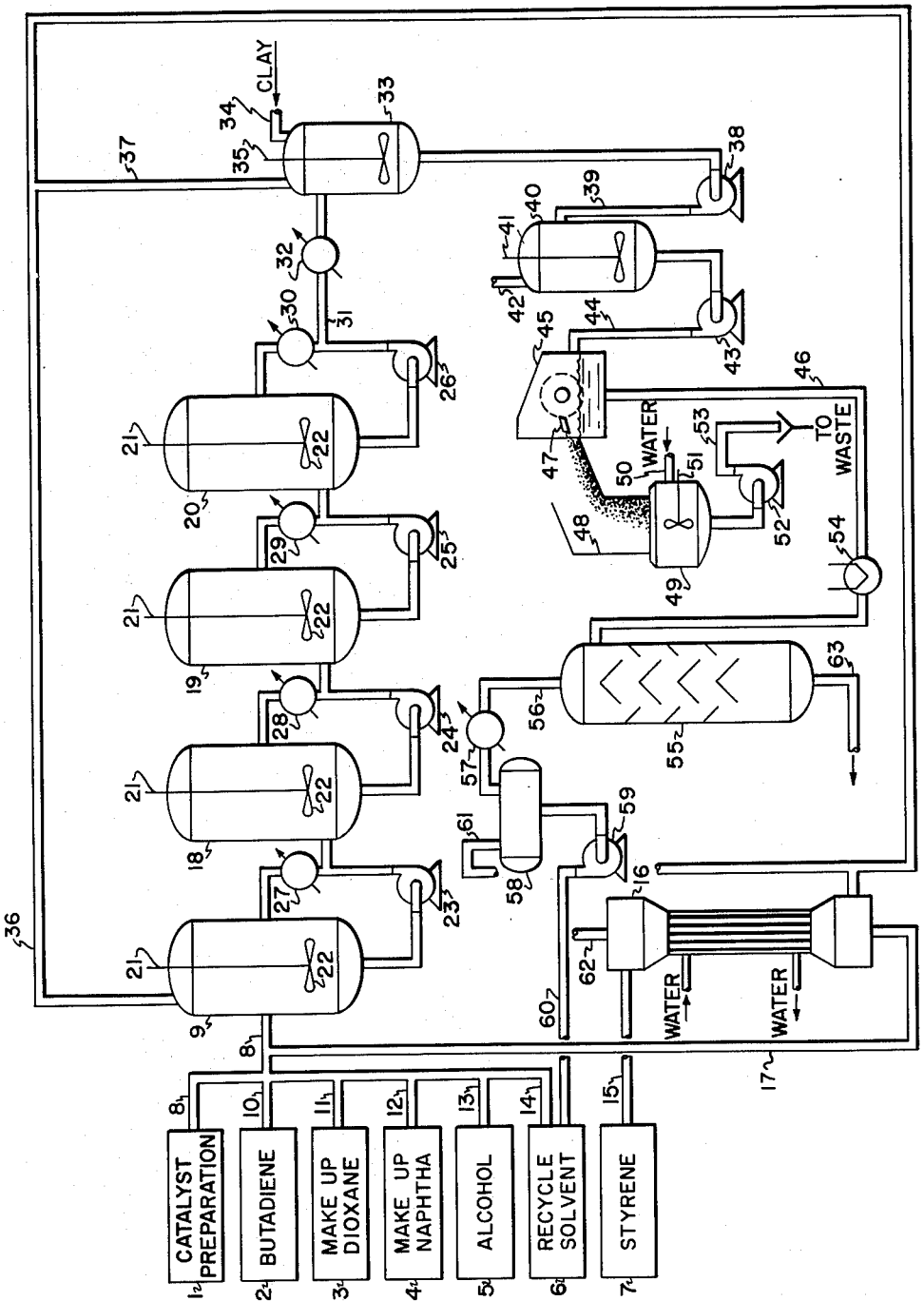
FIGURE 1 is a schematic illustration of one embodiment of the invention.

Referring now to FIGURE 1, a finely divided suspension of alkali metal catalyst, for example, sodium in naphtha, from catalyst preparation vessel 1, is introduced by line 8 into reactor 9. Simultaneously butadiene from tank 2, dioxane and naphtha make up diluent from tanks 3 and 4, alcohol from tank 5, and recycle solvent from tank 6, are passed by lines 10, 11, 12, 13, and 14, respectively, into reactor 9. Styrene from tank 7 is passed through line 15 into the tubes of scrubber condenser 16 thence, after absorbing the ether modifier and hydrocarbon solvent from gases in 16, through line 17 and into reactor 9. Offgases are vented from the reactor 9 through line 36 to scrubber condenser 16.

Although the reaction may be carried out batchwise in one stage as in reactor 9, the reactor preferably consists of a plurality of vessels, 9, 18, 19, and 20, particularly when employing a continuous process. A vertical shaft 21 bearing blades 22 is disposed centrally in each of vessels 9, 18, 19, and 20 as an agitator. Polymerization occurs in reactors 9, 18, 19, and 20 and the viscous polymer solution passes from stage to stage by means of pumps 23, 24, 25, and 26. These pumps also pump part of the reactor contents through coolers 27, 28, 29, and 30 where the heat of reaction is removed. The polymer solution passes from reactor 20 by line 31 through product cooler 32 to clay-treating vessel 33. Attapulgus clay containing 1–25 wt. percent bound water, preferably 5–15%, in an amount sufficient to neutralize the sodium and to absorb the alkali metal organic derivatives is added to vessel 33 through line 34.

The mixture in vessel 33 is agitated by stirrer 35 and the mixture is allowed to stand for a sufficient length of time to complete the removal of the sodium and organo-sodium compounds from the polymer. During this time, offgases are vented from the drum through line 37 to the scrubber condenser 16. After the removal of the sodium and organo-sodium compounds from the oil is complete, the mixture is passed by pump 38 through line 39 into filter feed drum 40. Mild agitation can be given the contents of this drum by agitator 41. A filter aid, such as celite and/or dilution solvent can be added to the polymer clay mixture by line 42. Filter feed tank 40 feeds by pump 43 through line 44 into rotary vacuum filter 45. A polymer solution free of sodium, organo-sodium compounds, clay, and filter aid is removed from the filter as filtrate through line 46. Spent filter cake is removed by doctor blade 47 and is passed by chute 48 into slurry drum 49 where it is slurried with water introduced through line 50. The drum is agitated by means of stirrer 51. The slurry is discharged to waste by pump 52 through line 53.

The polymer filtrate removed through line 46 is passed through preheater 54 to stripper 55. Hydrocarbon diluent, dioxane, and some residual monomer is removed as overhead from the stripper through line 56. Most of this overhead is condensed in condenser 57, discharged into distillate drum 58, and returned by pump 59 through line 60 to the recycle solvent tank 6. The uncondensed part of the stripper overhead passes from the distillate drum through line 61 where it is combined with the offgas from reactor 9 and the clay contacting drum 33. The combined gas stream is then passed to scrubber condenser 16 for dioxane recovery. The unabsorbed gases from the top of the scrubber condenser are vented through line 62. Copolymer of the desired concentration is removed from the bottom of stripper tower 55 through line 63.

It can be seen that uncondensed vapors containing significant amounts of dioxane and hydrocarbon solvent are removed from reactor 9 through line 36 and from the clay treating drum 33 through line 37 and from the stripper condenser distillate drum 58 through line 61. It is the main purpose of this invention to conduct these gases to an absorption vessel 16 where they are contacted counter-currently with styrene or other high boiling monomer or other process liquid introduced into the top of tower 16 by line 15. Tower 16 may be any suitable type of absorption tower but can be a tubular condenser in which styrene trickles down the walls of the tubes and functions essentially as a non-volatile scrubbing oil. The temperature in the tower is maintained at approximately 0 to 35° C. by providing indirect cooling through the tubes such as can be achieved by directing cooling water over the outside of the tubes. Recovery of dioxane and solvent is better the higher the pressure in the scrubber and the lower the temperature. Preferably a pressure of 1 to 5 atmospheres is maintained in the tower. Fat oil consisting of styrene containing absorbed dioxane, hydrocarbon solvent and other vapors are removed from the bottom of tower 16 by line 17 and passed to the feed inlet to reactor 9.

Figure 2:
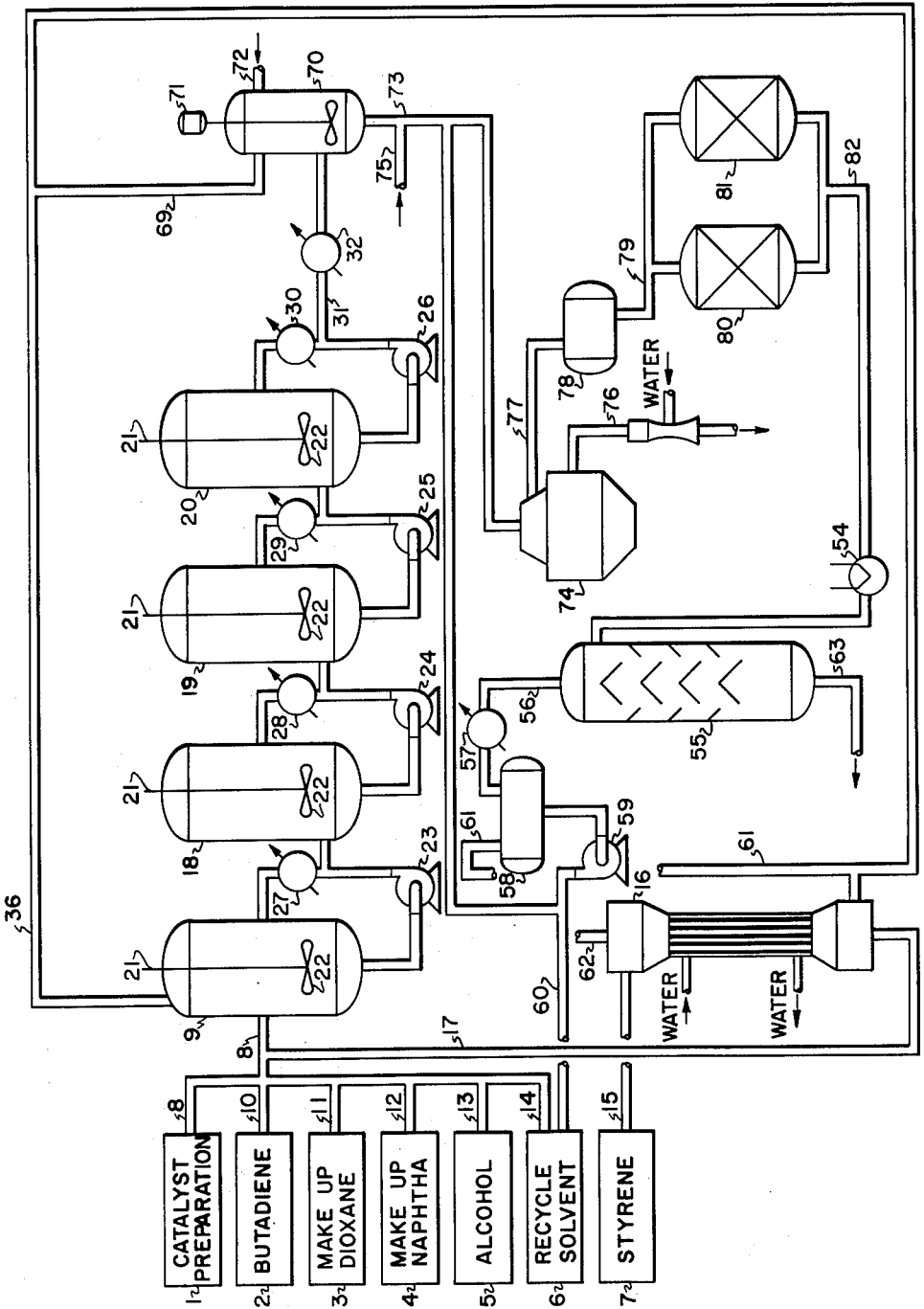
FIGURE 2 is a schematic illustration of another embodiment of the invention.

FIGURE 2 represents an alternate embodiment of this invention in which the catalyst is neutralized with water and removed by centrifuging. Referring now to FIGURE 2, polymer solution from reactor 20 is introduced by line 31 through product cooler 32 to vessel 70. An amount of water equal to about 1.1 to 2.0 moles per mole of alkali metal catalyst present is charged to this vessel through line 72. This water reacts with all of the sodium present, leaving very little free water to contaminate the product. The amount of water used, based on the volume of polymer solution, is only about 0.006 volume. Thus significant amounts of sodium salts are not extracted into a discrete water phase if the amount of water does not exceed 2.0 moles per mole of sodium. It is essential that this neutralization step take place in the presence of the ether promoter. The ether is necessary to act as a mutual solubilizer, allowing good contact of the water with the reactor product. The time of contact between the water and the polymer solution in vessel 70 may vary from five minutes to two hours, with the preferred time ranging from fifteen minutes to two hours. The temperature is maintained between 40 and 70° C. By increasing the temperature the residence time can be substantially reduced. Offgas from vessel 70 is passed by line 69 to line 36 where it is combined with the offgas from reactor 9.

After leaving neutralizing vessel 70, the polymer solution is passed by line 73 to centrifuge 74. This may be of any conventional type such as a disc centrifuge. Prior to entering the centrifuge the polymer solution is preferably diluted to 15–20% NVM. by the addition of recycle hydrocarbon diluent and ether promoter through line 75 in order to decrease polymer losses. Water and sludge consisting of gel and alkali metal hydroxide are removed to the sewer through line 76.

Gel-and alkali metal-free polymer product leaves the centrifuge through line 77 and passes to surge drum 78, thence by line 79 to clay percolator drum 80 and 81 arranged in parallel. These drums are filled with an absorbent material such as Attapulgus clay, fuller's earth, activated carbon and the like. These percolators remove the last traces of color bodies and gel and are necessary if the final product is to meet color and film-forming specifications. The final product is withdrawn through line 82 and passed to stripper 55. As described in FIGURE 1 the uncondensed portion of the stripper overhead is passed by line 61 and in this embodiment is combined with the offgas from reactor 9 and the catalyst neutralizer 70 and the combined stream passed to scrubber condenser 16 for dioxane recovery as described in FIGURE 1.

Figure 3:
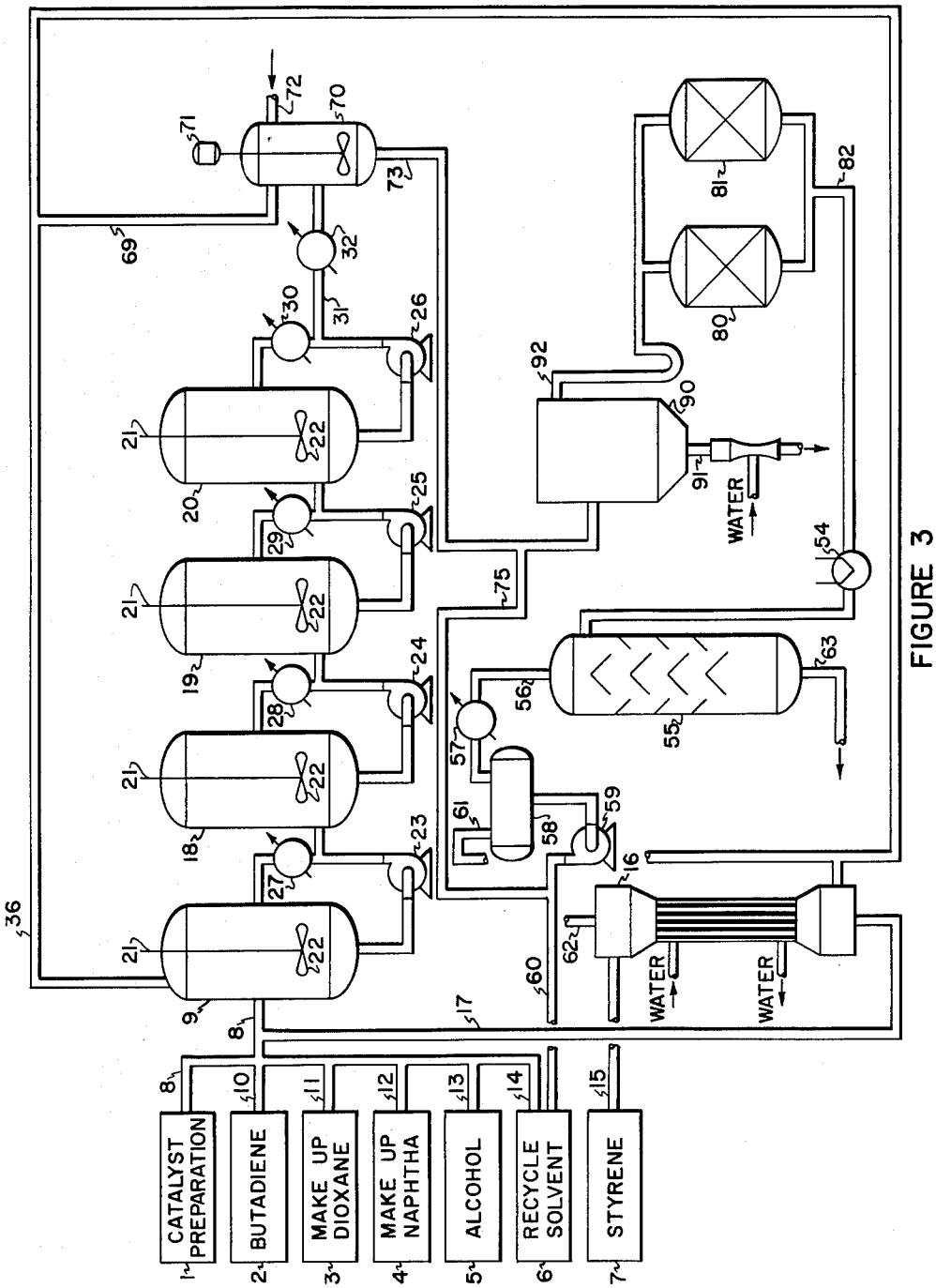
FIGURE 3 is a schematic flow diagram of a modification of FIGURE 2.

Referring now to FIGURE 3, a modification of FIGURE 2, is shown in which the centrifuge is placed by a drum settler.

In this embodiment reactor product flowing in line 31 is passed to vessel 70 having stirrer 71 where it is contacted with water as described in connection with vessel 70 of FIGURE 2. Offgas is removed through line 69 and combined with the offgas from reactor 9 flowing in line 36. From neutralizer 70 the product passes by line 73 to settler 90 after being diluted to 15–20% NVM. by recycled diluent and ether from line 75. In settler 90 the product settles into two phases, a lower gel phase containing alkali metal hydroxide which is removed through line 91 and an upper polymer phase which is drawn off by line 92 direct to clay percolators 80 and 81 which are the same as those shown in FIGURE 2. Gel and alkali metal-free product is withdrawn through line 82 and passed to stripper 55. As described in connection with FIGURES 1 and 2, offgas from stripper 55 is combined with that flowing in line 36 and passed to scrubber 16.

FIGURE 4 represents an embodiment in which the catalyst is washed with large amounts of water after removal of the diluent. Referring now to FIGURE 4 polymer solution from reactor 20 passes by line 31 to mixer 123 where it contacts isopropyl alcohol introduced through line 124 to neutralize any free sodium present, otherwise the presence of free sodium in the dioxane removal tower would degrade the polymer at the temperatures prevailing therein. Offgas from mixer 123 containing hydrocarbon solvent, dioxane, and hydrogen is passed by line 122 to line 61 where it is combined with offgas from reactor 9 and stripper 55 and passed to styrene scrubber 16. The neutralized effluent passes from mixer 123 through line 125 to dioxane removal tower 126. This tower is operated at a bottoms temperature of 157° C. and a top temperature of 116° C. to remove naphtha-dioxane mixture containing 80 mol percent dioxane and 20 mol percent naphtha overhead through line 127 for recycling back to the recycle diluent storage tank 6. A solution of polymer in naphtha and substantially free of dioxane is removed through line 128. The diluted polymer passed to wash drum 131 where it is mixed with acidified water introduced through line 132 in a ratio of about one-tenth to one volume of water per volume of polymer solution. The mixture of acidified water and polymer solution from neutralizer 131 is then passed by line 133 to settling drum 134. After settling has taken place, usually in 5 to 10 minutes, washed polymer solution is withdrawn through line 135 and passed by line 135 to clay towers 80 and 81 as in FIGURE 2. The purified polymer solution is then passed by line 145 to stripper 55 where it is stripped under vacuum at a bottom temperature of 175° C. to remove hydrocarbon solvent overhead through line 56 which is then passed, part to the condensing drum 58 and part by way of line 129 to dilute the polymer bottoms from the ether removal tower. Condensed solvent in drum 58 is passed to naphtha drum 4 by line 63 and pump 59. Uncondensed gases from drum 58 are passed by line 61 to scrubber condenser 16. Finished polymer is withdrawn from the bottom of stripper 55 through line 63 and passed to storage.

Spent wash water from settling drum 134 is withdrawn through line 136 and discarded.

FIGURE 5 represents a modification of the embodiment of FIGURE 4 in which the catalyst is washed with large amounts of water containing ether without prior removal of the ether. Referring, therefore, to the drawing, polymer solution from reactor 20 passes by line 31 to mixer 70 where it is contacted with a mixture of acidified water and dioxane from line 72, in a ratio of about one-tenth to one volume of water and dioxane per volume of polymer solution.

Acids which may be used to acidify the aqueous ether wash mixture include hydrochloric, sulfuric, acetic, carbonic, hydrofluoric and the like. However, preferred acids are those which are volatile at the polymer stripping temperature of about 175° C. so that residual amounts of acid in the polymer-hydrocarbon-ether phase will be removed from the polymer along with hydrocarbon and ether in the polymer stripping operation.

The amount of dioxane mixed with the water is sufficient to prevent any dioxane from being washed out of the effluent flowing in line 31. Offgas from mixer 70 is passed by line 69 to line 36 in which offgas from reactor 9 is flowing. The mixture of acidified water and polymer solution from mixer 70 is passed by line 224 to settling drum 225. After complete settling has taken place, usually in one to two hours, the spent wash water leaves settler 225 through line 227 and is passed to dioxane stripping tower 228 where it is stripped with open steam introduced through line 231. A water-dioxane mixture approaching the azeotropic composition is removed overhead through line 229 and recycle to line 72. Water containing sodium salts in solution which have been washed out of the polymer is withdrawn from the bottom of tower 228 through line 230 and discarded.

The washed polymer solution in naphtha and dioxane withdrawn from settler 225 through line 226 is passed to clay towers 80 and 81 arranged in parallel. In these towers the yellowish polymer is percolated through clay such as fuller's earth or Attapulgus or other clay to remove color bodies and gel particles and produce a colorless gel-free product which yields films which are free from surface imperfections. The purified polymer solution is then passed by line 46 to stripping tower 55 having a bottoms temperature of 175° C. where naphtha and dioxane are stripped overhead under vacuum and withdrawn through line 56 to condensing drum 58. Off-gas separated from distillate drum 58 is removed by line 61, combined with that flowing in line 36 and passed to styrene scrubber 16. Polymer product is withdrawn through line 63 to storage.

It is obvious from the above description that the present invention has the advantage of recovering valuable amounts of dioxane or other ether from gases which would be otherwise lost to the atmosphere. This advantage is accomplished by scrubbing these gases with a portion or all of the feed vinyl aromatic hydrocarbon to the reactor. The vinyl aromatic hydrocarbon absorbs the ether and other constituents and thus recovers them for use in the process.

It is obvious, of course, that vent gas streams removed from any point in the process other than those mentioned which contain ether and hydrocarbon solvent, can be scrubbed by contacting with feed styrene.

In its broadest form, therefore, this invention is directed to a process for producing a liquid copolymer of a diolefin and a vinyl aromatic hydrocarbon in which 60 to 85 parts by weight of a conjugated diolefin and 15 to 40 parts of vinyl aromatic hydrocarbon, 50 to 500 parts by weight of a hydrocarbon diluent, boiling between −15 and 200° C., 10 to 40 parts by weight of an aliphatic ether, 0.5 to 10 parts by weight of a finely divided alkali metal catalyst and 0 to 35% of an aliphatic alcohol of 1 to 5 carbon atoms, based on the weight of the alkali metal are contacted in a polymerization zone at a temperature between 20° and 105° C. to form a liquid polymerization product, and in which uncondensed gases including ether and hydrocarbon vapor are separated from the liquid polymerization product and the separated gases are contacted with the vinyl aromatic hydrocarbon used in the polymerization at substantially ambient temperatures and pressures of 1 to 5 atmospheres, whereby the ether and solvent are absorbed in the vinyl aromatic hydrocarbon and the fat vinyl aromatic hydrocarbon is passed to the polymerization zone.

Ether and hydrocarbon vapors may be separated from the polymerization product while in the reactor, as from reactor 9, of FIGURES 1, 2, 3, 4, and 5, as well as later in the process as from the clay contacting zone 33 of FIGURE 1, the catalyst neutralizing zone 70 of FIGURES 2, 3, and 5, the acid wash drum 131 of FIGURE 4, and the distillate drum 58 of FIGURES 1, 2, 3, 4, and 5. These various streams are all collected, as in line 36, of each of the figures of the drawings, and passed to scrubber condenser 16 where the combined stream is contacted with the vinyl aromatic hydrocarbon monomer to the process to absorb the ether and hydrocarbon diluent.

The advantages of the invention will be better understood from a consideration of the following data which are given for the sake of illustration, but without intention of limiting the invention thereto.

EXAMPLE 1

A butadiene-styrene copolymer was prepared in the five-stage commercial continuous process described in FIGURE 1. The monomers, diluents, catalyst, etc., were continuously added to the first stage 9 in the following proportions.

| | Parts by weight |
|---|---|
| Butadiene | 80 |
| Styrene | 20 |
| Naphtha | 200 |
| Dioxane | 40 |
| Isopropanol | 0.2 |
| Sodium | 1.5 |

The polymerization was carried out at 50° C. Product flowed from stage to stage and was withdrawn from the last stage 20, treated with clay in drum 33, filtered and stripped as described in connection with FIGURE 1.

Vent gases obtained in this process are collected from reactor 9 via line 36, from the clay mixing drum 33 via line 37 and the condensing drum 58 via line 61, combined and passed to scrubber condenser 16 where they are contacted countercurrently with styrene from storage drum 7 to recover dioxane and hydrocarbon solvent. The following data illustrate the process.

*Table 1*

| | 1st Stage Reactor Vent Gas | Clay Mixing Drum Vent Gas | Stripper Condenser Vent Gas | Combined Gas Stream to Scrubber | Styrene | Scrubber Offgas | Scrubber Bottoms |
|---|---|---|---|---|---|---|---|
| Stream (Referring to drawing) | 36 | 37 | 61 | | 15 | 62 | 87 |
| Temperature, °F | 140 | 140 | 100 | 102 | 100 | 100 | 100 |
| Pressure, p.s.i.g | 60 | 0 | 220 mm. Hg | 2 | 0 | 0 | 2 |
| Flow Rates in Lbs. Per Hour | | | | | | | |
| Components: | | | | | | | |
| Dioxane | 0.76 | 3.4 | 140 | 144.2 | | 9.4 | 134.8 |
| Naphtha (C$_7$) | 1.16 | 5.3 | 182 | 188.5 | | 6.3 | 182.2 |
| Light Hydrocarbons | 1.06 | 4.6 | 98 | 103.7 | | 87.0 | 16.7 |
| Non-Condensibles | 0.04 | 0.2 | 63 | 63.2 | | 63.2 | |
| Styrene | | | | | 421 | | 471.0 |
| | 3.02 | 13.5 | 483 | 499.6 | 421 | 165.9 | 754.7 |

The nature of the present invention having been thus fully set forth and illustrated and specific examples of the same given, what is claimed as new and useful and desired to be secured as Letters Patent is:

1. In a continuous process for producing a liquid copolymer in which a mixture of 80 parts by weight of butadiene-1,3 and 20 parts by weight of styrene, 50 to 500 parts by weight of a hydrocarbon diluent boiling between 100 and 200° C., 10 to 40 parts by weight of dioxane-1,4, 0.5 to 10 parts by weight of sodium and 0 to 35% of isopropyl alcohol, based on the weight of sodium, are continuously charged to the first stage of a multistage polymerization zone where it is heated to a temperature between 25 and 105° C., and in which a liquid polymerization product is continuously withdrawn from the final stage of the said polymerization zone, contacted with clay in a mixing zone to neutralize the sodium, filtered to separate the clay and adsorbed sodium, stripped to separate the hydrocarbon diluent and dioxane and in which the diluent and dioxane are condensed in a condensing zone, the improvement which comprises separating a first stream of uncondensed gases, including hydrocarbon diluent and dioxane, from the first stage of said polymerization zone, separating a second stream of uncondensed gases, including diluent and dioxane, from said mixing zone and separating a third stream of uncondensed gases, including diluent and dioxane, from said condensing zone, combining said first, second, and third uncondensed gas streams and contacting the combined stream with styrene at temperatures of 0° to 35° C. and pressures of 1 to 5 atmospheres whereby said diluent and dioxane are absorbed in said styrene and passing said styrene containing said dioxane and diluent to said polymerization zone.

2. In a continuous process for producing a liquid copolymer in which a mixture of 80 parts by weight of butadiene-1,3 and 20 parts by weight of styrene, 50 to 500 parts by weight of a hydrocarbon diluent boiling between 100 and 200° C., 10 to 40 parts by weight of dioxane-1,4, 0.5 to 10 parts by weight of sodium and 0 to 35% of isopropyl alcohol, based on the weight of sodium, are continuously charged to the first stage of a multi-stage polymerization zone where it is heated to a temperature between 25 and 105° C., and in which a liquid polymerization product is continuously withdrawn from the final stage of the said polymerization zone, contacted with 1.1 to 2 moles water per mole sodium in a catalyst neutralizing zone, centrifuged to separate the water, percolated through clay to separate color bodies and gel, stripped to separate the hydrocarbon diluent and dioxane and in which the diluent and dioxane are condensed in a condensing zone, the improvement which comprises separating a first stream of uncondensed gases, including hydrocarbon diluent and dioxane, from the first stage of said polymerization zone, separating a second stream of uncondensed gases, including diluent and dioxane, from said catalyst neutralizing zone and separating a third stream of uncondensed gases, including diluent and dioxane, from said condensing zone, combining said first, second and third uncondensed gas streams and contacting the combined stream with styrene at temperatures of 0° to 35° C. and pressures of 1 to 5 atmospheres whereby said diluent and dioxane are absorbed in said styrene and passing said styrene containing said dioxane and diluent to said polymerization zone.

3. In a continuous process for producing a liquid copolymer in which a mixture of 80 parts by weight of butadiene-1,3 and 20 parts by weight of styrene, 50 to 500 parts by weight of a hydrocarbon diluent boiling between 100 and 200° C., 10 to 40 parts by weight of dioxane-1,4, 0.5 to 10 parts by weight of sodium and 0 to 35% of isopropyl alcohol, based on the weight of sodium, are continuously charged to the first stage of a multi-stage polymerization zone where it is heated to a temperature between 25 and 105° C., and in which a liquid polymerization product is continuously withdrawn from the final stage of the said polymerization zone, contacted with 1.1 to 2 moles water per mole sodium in a catalyst neutralizing zone, settled to separate the water, percolated through clay to separate color bodies and gel, stripped to separate the hydrocarbon diluent and dioxane and in which the diluent and dioxane are condensed in a condensing zone, the improvement which comprises separating a first stream of uncondensed gases, including hydrocarbon diluent and dioxane, from the first stage of said polymerization zone, separating a second stream of uncondensed gases, including diluent and dioxane, from said catalyst neutralizing zone and separating a third stream of uncondensed gases, including diluent and dioxane, from said condensing zone, combining said first, second and third uncondensed gas streams and contacting the combined stream with styrene at temperatures of 0° to 35° C. and pressures of 1 to 5 atmospheres whereby said diluent and dioxane are absorbed in said styrene and passing said styrene containing said dioxane and diluent to said polymerization zone.

4. In a continuous process for producing a liquid copolymer in which a mixture of 80 parts by weight of butadiene-1,3 and 20 parts by weight of styrene, 50 to 500 parts by weight of a hydrocarbon diluent boiling between 100 and 200° C., 10 to 40 parts by weight of dioxane-1,4, 0.5 to 10 parts by weight of sodium and 0 to 35% of isopropyl alcohol, based on the weight of sodium, are continuously charged to the first stage of a multi-stage polymerization zone where it is heated to a temperature between 25 and 105° C., and in which a liquid polymerization product is continuously withdrawn from the final stage of the said polymerization zone, contacted with an alcohol to neutralize the sodium in a catalyst neutralizing zone, distilled to remove dioxane, contacting in a washing zone with 0.1 to 1 volume of water per volume of polymerization product, settled to separate water, percolated through clay to separate color bodies and gel, stripped to separate the hydrocarbon diluent and dioxane and in which the diluent and dioxane are condensed in a condensing zone, the improvement which comprises separating a first stream of uncondensed gases, including hydrocarbon diluent and dioxane, from the first stage of said polymerization zone, separating a second stream of -uncondensed gases, including diluent and dioxane, from said catalyst neutralizing zone and separating a third stream of uncondensed gases, including diluent and dioxane, from said condensing zone, combining said first, second and third uncondensed gas streams and contacting the combined stream with styrene at temperatures of 0° to 35° C. and pressures of 1 to 5 atmospheres whereby said diluent and dioxane are absorbed in said styrene and passing said styrene containing said dioxane and diluent to said polymerization zone.

5. In a continuous process for producing a liquid copolymer in which a mixture of 80 parts by weight of butadiene-1,3 and 20 parts by weight of styrene, 50 to 500 parts by weight of a hydrocarbon diluent boiling between 100 and 200° C., 10 to 40 parts by weight of dioxane-1,4, 0.5 to 10 parts by weight of sodium and 0 to 35% of isopropyl alcohol, based on the weight of sodium, are continuously charged to the first stage of a multi-stage polymerization zone where it is heated to a temperature between 25 and 105° C., and in which a liquid polymerization product is continuously withdrawn from the final stage of the said polymerization zone, contacted with 0.1 to 1 volume of a water dioxane solution per volume of polymerization product in a catalyst neutralizing zone, settled to separate the water, percolated with clay to separate color bodies and gel, stripped to separate the hydrocarbon diluent and dioxane and in which the diluent and dioxane are condensed in a condensing zone, the improvement which comprises separating a first stream of uncondensed gases, including hydrocarbon diluent and dioxane, from the first stage of said polymerization zone, separating a second stream of uncondensed gases, including diluent and dioxane, from said catalyst neutralizing zone and separating a third stream of uncondensed gases, including diluent and dioxane, from said condensing zone, combining said first, second, and third uncondensed gas streams and contacting the combined stream with styrene at substantially ambient temperatures of 0° to 35° C. and pressures of 1 to 5 atmospheres whereby said diluent and dioxane are absorbed in said styrene and passing said styrene containing said dioxane and diluent to said polymerization zone.

References Cited by the Examiner
UNITED STATES PATENTS

| | | | |
|---|---|---|---|
| 2,758,068 | 8/1956 | Howard | 208—101 |
| 2,992,180 | 7/1961 | Schatz et al. | 260—669 |
| 2,999,891 | 9/1961 | Gleason et al. | 260—669 |
| 3,044,952 | 7/1962 | Baumann et al. | 208—101 |

ALPHONSO D. SULLIVAN, *Primary Examiner.*